US011464605B2

(12) United States Patent
Thomé et al.

(10) Patent No.: US 11,464,605 B2
(45) Date of Patent: Oct. 11, 2022

(54) DENTAL IMPLANT

(71) Applicant: JJGC INDÚSTRIA E COMÉRCIO DE MATERIAIS DENTÁRIOS S.A., Paraná (BR)

(72) Inventors: Geninho Thomé, Curitiba (BR); Felix Andreas Mertin, Curitiba (BR); Rafael Calixto Salatti, Curitiba (BR)

(73) Assignee: JJGC INDÚSTRIA E COMÉRCIO DE MATERIAIS DENTÁRIOS S.A., Curitiba (BR)

( * ) Notice: Subject to any disclaimer, the term of this patent is extended or adjusted under 35 U.S.C. 154(b) by 201 days.

(21) Appl. No.: 16/632,292

(22) PCT Filed: Aug. 16, 2017

(86) PCT No.: PCT/BR2017/050231
§ 371 (c)(1),
(2) Date: Jan. 17, 2020

(87) PCT Pub. No.: WO2019/014736
PCT Pub. Date: Jan. 24, 2019

(65) Prior Publication Data
US 2020/0360116 A1     Nov. 19, 2020

(30) Foreign Application Priority Data

Jul. 19, 2017  (BR) .......................... 102017015490-4

(51) Int. Cl.
*A61C 8/00*     (2006.01)
(52) U.S. Cl.
CPC .......... *A61C 8/0025* (2013.01); *A61C 8/0089* (2013.01)

(58) Field of Classification Search
CPC ... A61C 8/0025; A61C 8/0089; A61C 8/0022; A61C 8/0018; A61C 8/0028
(Continued)

(56) References Cited

U.S. PATENT DOCUMENTS

| 4,229,169 A | 10/1980 | Smith et al. |
| 4,407,620 A | 10/1983 | Shinjo |

(Continued)

FOREIGN PATENT DOCUMENTS

| BR | 102014031426 A2 | 7/2016 | |
| WO | WO-2009054005 A2 * | 4/2009 | ........... A61C 8/0022 |

(Continued)

OTHER PUBLICATIONS

Mar. 28, 2018 Search Report issued in International Patent Application No. PCT/BR2017/050231.

*Primary Examiner* — Ralph A Lewis
*Assistant Examiner* — Mirayda A Aponte
(74) *Attorney, Agent, or Firm* — Oliff PLC

(57) ABSTRACT

A dental implant including a core; at least one screw thread; a first and second region; a central axis; the surface of the core defining an angle with the central axis in the first region and with the central axis in the second region; and the surface of the screw thread defining an angle with the central axis in the first region and with the central axis in the second region. The diameter of the core decreases at a rate in the first region towards the apical end such that the core defining angle is greater than the screw thread defining angle, and the diameter of the core decreases at a rate in the second region towards the apical end such that the core defining angle is the same as the screw thread defining angle. Furthermore, an implant including at least one helical chamber including a depth and length.

15 Claims, 6 Drawing Sheets

(58) Field of Classification Search
USPC .................................................. 433/174, 6
See application file for complete search history.

(56) References Cited

U.S. PATENT DOCUMENTS

| | | |
|---|---|---|
| 5,312,256 A | 5/1994 | Scortecci |
| 5,897,319 A | 4/1999 | Wagner et al. |
| 2016/0166358 A1* | 6/2016 | Thome .................. A61C 8/006 433/174 |

FOREIGN PATENT DOCUMENTS

| | | | | |
|---|---|---|---|---|
| WO | WO-2017027604 A1 * | 2/2017 | ........... | A61C 8/0037 |
| WO | WO-2018235119 A1 * | 12/2018 | ........... | A61C 8/0022 |

* cited by examiner

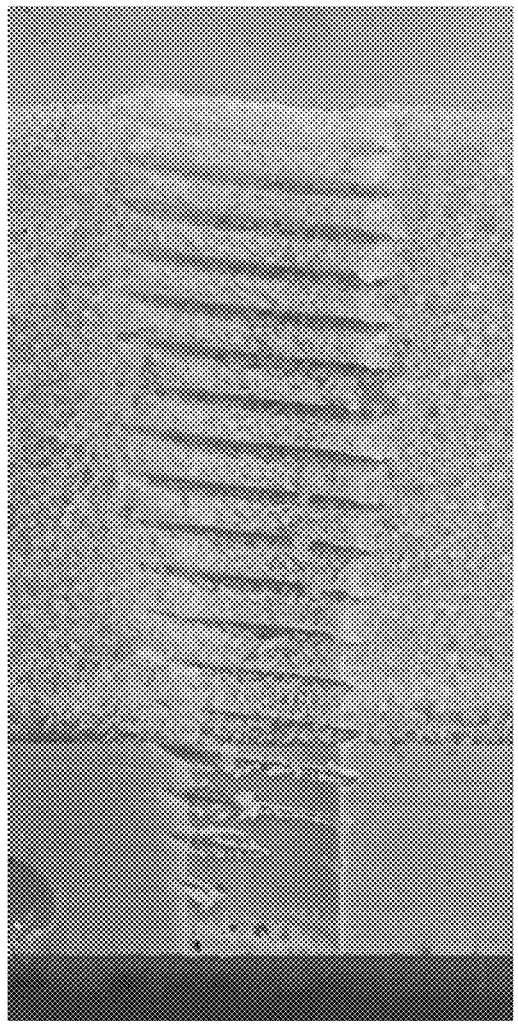
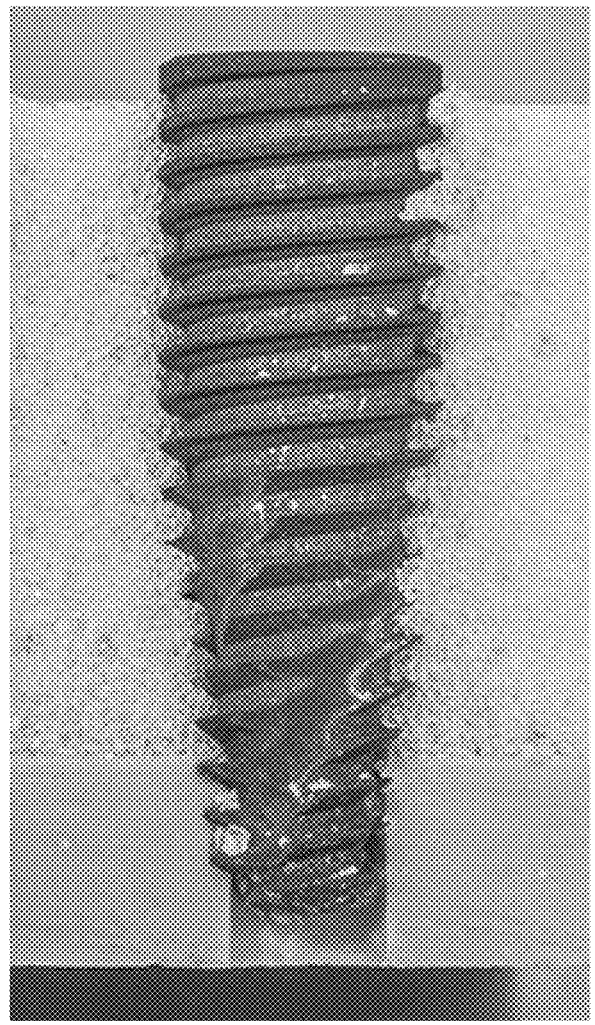
FIG. 6A
FIG. 6B

DENTAL IMPLANT

FIELD OF THE INVENTION

The present invention relates in general to osseointegrated implants, more specifically the present invention relates to a dental implant comprising regions of optimized geometry and helical chambers.

BACKGROUND

Osseointegrated dental implants are artificial components made of biocompatible materials such as titanium or ceramics. These implants are inserted in bone tissue and then integration thereto occurs. Dental implants aim to rehabilitate the patient in order to anchor prosthetic components that will receive dental prostheses responsible for replacing natural teeth lost for various reasons.

In general, the success of a dental implant as an anchor of a prosthetic component depends on its stability over time. As is well known to those skilled in the art, there are basically two types of stability, namely primary stability and secondary stability.

Fundamentally, primary stability represents the mechanical stability of the set (implant/bone) and, when it is obtained at the time of installation of said implant, it may enable the use of the immediate loading technique (when the prosthesis is immediately installed after the placement of the implant). In turn, secondary stability represents the stability obtained with the osseointegration of the implant and is obtained after a certain period of time.

Ideally, primary stability should be achieved at the time of installation of the implant, which depends substantially on the bone characteristics and also on the geometrical characteristics of the implant, such as geometry and dimensions of the threads, core-to-thread angulation, implant surface treatments, among other aspects.

Secondly, and in the medium to long term, secondary stability depends, among other aspects, on the acceptance of the piece by the patient's body and its integration with bone tissue, such facts that are mainly determined by the following characteristics: clinical condition of the patient, quality of the implant material, treatment of the implant surface and absence of bone necrosis in the surgical alveolus.

It is mandatory, therefore, to provide an implant of biocompatible material that is conducive to integration with bone tissue and endowed with mechanical characteristics that favor its stability; simplifying and facilitating complete rehabilitation of the patient.

In turn, regarding the surgical procedure, there are several techniques of implant installation. Basically, the procedure for installing a dental implant involves the following steps: opening the soft tissue to access the bone tissue; leveling of the implant installation region (if necessary); carrying out a pilot drilling with a drill bit for this purpose; gradual opening of the implant insertion hole by means of sequential drilling and setting the drill bit insertion opening profile for this purpose (if necessary).

In certain cases, when threaded implants are installed, one or more threading males are used to prepare the bone surface to allow the correct reception of the implant screw thread.

Moreover, those skilled in the art will recognize that there are different types of bone tissues regarding the level of hardness. Basically, there are four types of bones, according to Lekholm and Zarb (1985) bone classification: Type 1—residual bone formed by homogeneous cortical bone; Type 2—residual bone formed by a thick layer of cortical bone surrounding dense trabecular bone; Type 3—residual bone formed by a thin layer of cortical bone surrounding dense trabecular bone; Type 4—residual bone formed by a thin layer of cortical bone surrounding low-density spongy bone.

Bones considered to be hard (types 1 and 2) are more difficult to drill, however, allow more easily for an adequate primary stability to be obtained at the installation of a dental implant. Following the same logic, it is noted that bones considered soft (types 3 and 4) are easier to be drilled, however, are more difficult to achieve a primary stability.

Further, it is essential to mention that the same bone region may comprise different hardness profiles, a fact that represents greater complexity in the installation of an implant.

As already mentioned, during implant installation procedure, males can be used to create threads at the insertion site, however, this procedure is not indicated for bones considered to be soft. In addition, it represents an additional stage of the surgical process.

On the other hand, implants that have a cutting apical end are already known, to replace or minimize the step of using thread opening males. In these implants, the apical end itself (together with the implant body) prepares the bone surface, making the thread on which the implant will be supported.

For example, in the document U.S. Pat. No. 4,229,169, Smith et al. defines a dental implant for insertion in jawbone comprising a self-screwing metal screw. In the document U.S. Pat. No. 4,407,620, Shinjo goes further, defining a self-tapping screw comprising an elongated threaded rod with a driving head at one end and a drill tip at the opposite end, wherein the drill tip includes at least two equally splines spaced from each other about a central axis of the rod, each spline having a cutting edge.

The implant proposed by Shinjo is especially adapted for spongy bone types. However, in practice this presented four major problems: lack of stability during the drilling stage in different types of bone; no possibility of outflow of the cut remains; a proportionally small threaded area, reducing implant stability immediately after the installation; and especially, risk, in case of excess torque, of the perforating lower edge entering other biological structures and injuring, for example, the patient's motor nerves.

The implants were gradually being improved to include a larger possible area of thread to provide stability after installation, round apexes to mitigate the chance of injuries during installation, and sharp edges integrated with the threads to at least provide the function of self-tapping. In the document U.S. Pat. No. 5,312,256, Scortecci describes a round apex, cylindrical body dental implant in which openings are provided to allow bone growth and a hexagonal support for receiving a prosthetic component and a retaining screw thereof. In the apical portion of the implant proposed, Scortecci includes two broad-threaded parts, numbered 11 and 12, for self-tapping and or bone retention where a thread has already been opened. The document U.S. Pat. No. 5,897,319 is representative of the most commonly adopted implants today.

However, implant installation problems are still recurring and intensified due to the different types of bones. This is because, although known, these bones are not always arranged homogeneously or clearly identifiable in each patient. The surgeon must therefore adapt his insertion strategy and implant installation torque during surgery, which can lead to errors, especially in less experienced surgeons. Furthermore, the varied geometries of various implants are reflected in distinct installation characteristics, such as higher or lower torque during installation. This variance in implant installation torque by the type of bone on which it is installed makes the work of the surgeon even more difficult.

Ideally, application torques during implant installation are similar, allowing the surgeon to recognize in the act when an implant is correctly inserted, without risks of the implant not being properly installed. It so happens that surgeons get used not only to the procedure of installing a type of implant, but also with the strength necessary to do the installation. This makes it difficult, for example, to change the implant type once the doctor/dentist, is accustomed to a particular implant, is reluctant to retraining or, in order to minimize the risk of the implant becoming loose, ends up tightening the implant too much, which may lead to problems due to excessive torque in the installation, such as cracks in bone tissue or in some cases even bone necrosis.

It is desirable, therefore, that an implant, regardless of diameter, has a similar installation torque and, can be installed on all bone types, minimizing errors due to incorrect choice of implant.

It is necessary, therefore, that an implant is able to obtain stability in various types of bones, facilitating its use and installation and, obtaining stability, both primary and secondary; this implant should also provide uniform installation torque that reduces the chances of errors on the part of surgeons. In addition, the implant must be able to open its own screw thread so that it partially replaces the opening stages with profile drill bits.

SUMMARY OF THE INVENTION

Thus, the fundamental object of the present invention is to disclose a dental implant comprising a core; at least one screw thread defined over the core; a first region and a second region and a central axis, wherein a surface of the core defines an angle with the central axis in the first region and an angle with the central axis in the second region. In addition, it should comprise a threaded surface that defines an angle with the central axis in the first region and an angle with the central axis in the second region.

More specifically, the present invention describes an implant wherein the core diameter decreases at a rate in the first region toward the apical end, such that the angle of the core to the central axis is greater than the screw thread angle in relation to the same axis. Also, the diameter of the core decreases at a rate in the second region towards the apical end such that angle of the core is the same as the screw thread angle, both in relation to the central axis of the implant.

In addition, the present invention discloses an implant comprising at least one helical chamber, said helical chamber comprising a depth, which is measured with respect to the screw crest. In addition, this helical chamber comprises a length which is measured between its lower end and its upper end.

Further, the present invention provides an implant in which the screw thread comprises a screw crest thickness in the first variable region and increasing toward the coronal end of said implant.

Furthermore, the present invention provides for an implant in which the screw thread has a pitch and a thread fillet height, the screw thread pitch ranging from a minimum to a maximum value, while the thread fillet height varies between a minimum and a maximum value throughout the implant.

The present invention also provides an implant wherein said helical chambers have a depth varying along their length, such that the smallest depth value occurs at the ends of said helical chamber.

In addition, the present invention provides a helical chamber with depth which has a lower value than the minimum thread fillet height at the ends of said helical chamber and a higher value than the maximum thread fillet height close to the midpoint of the length of said helical chamber.

Finally, the present invention provides an implant wherein said helical chamber extends from the second implant region to the first implant region.

BRIEF DESCRIPTION OF THE DRAWINGS

FIG. 6A illustrates a cross-section of the (artificial) bone opening after insertion of the proposed implant; and FIG. 6B illustrates a cross-section of the (artificial) bone opening with the proposed implant installed.

DETAILED DESCRIPTION OF THE INVENTION

FIGS. 1 to 5 illustrate an implant 1 according to a preferred embodiment of the present invention, which may be made of any biocompatible material suitable for use in osseointegrated implants, preferably of titanium or alloys thereof, in particular commercially pure titanium (Grade 4). In one possible embodiment, the implant of the present invention may be made of ceramic material.

Figure 1:
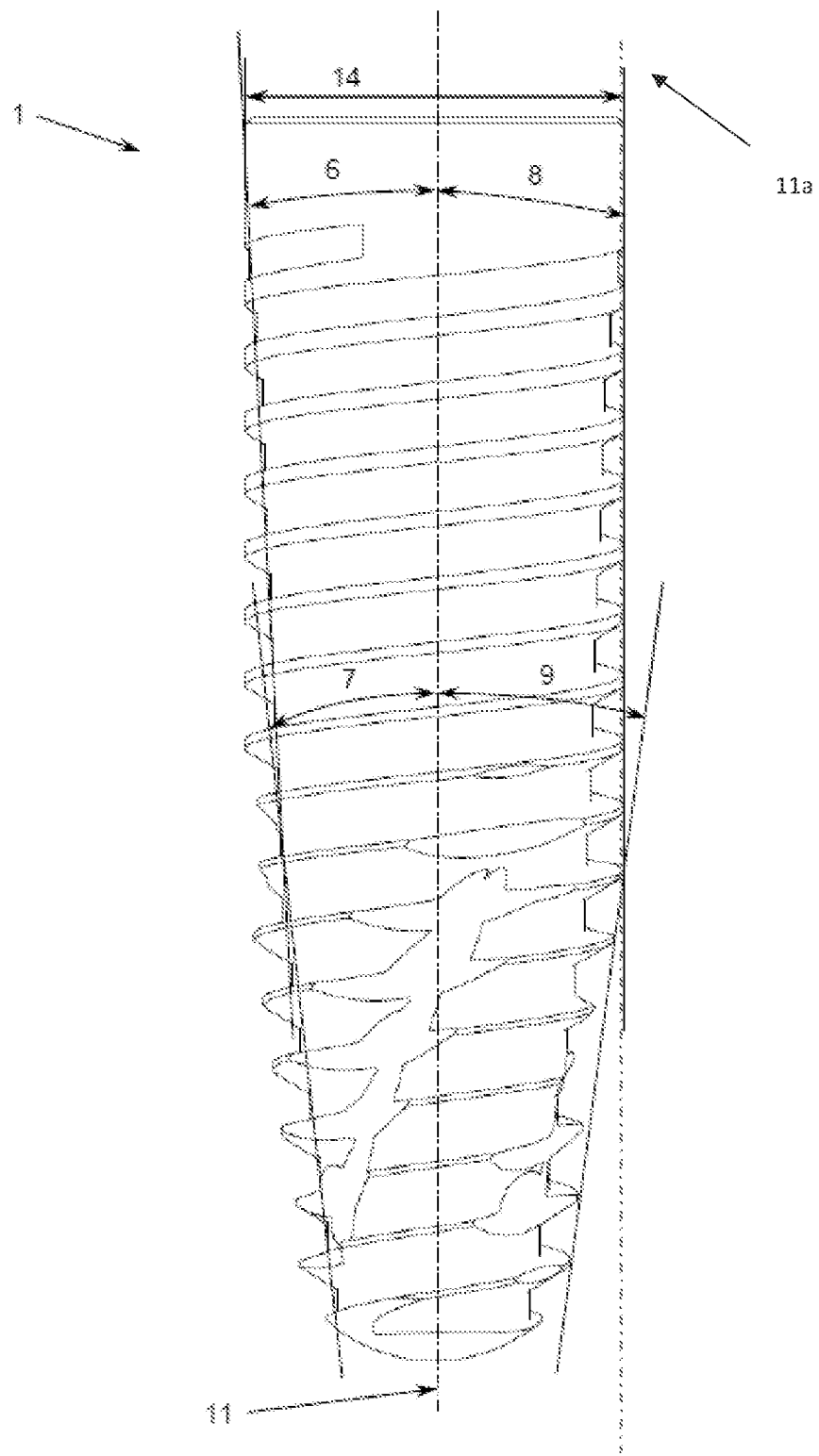
FIG. 1 illustrates a front view of the proposed implant highlighting core and screw threads angulations.

As can be seen from the accompanying figures, the implant 1 is provided with a core 2, at least one screw thread 3, an apical end 16 and an opposite coronal end 17; said implant 1 having the general shape of a single or double screw thread. The length 10 of the implant 1 is defined by a central axis 11, which is measured between the said apical end 16 and the coronal end 17. FIG. 1 further indicates a projected position 11a of the central axis 11 when moved to the outer thread line.

At the upper portion of the coronal end 17 (within the implant) is arranged a prosthetic interface 4 of implant 1, which may be of any type known in the art such as, for example, morse taper, external hexagon or internal hexagon or any other kind of suitable prosthetic interface.

Figure 2:
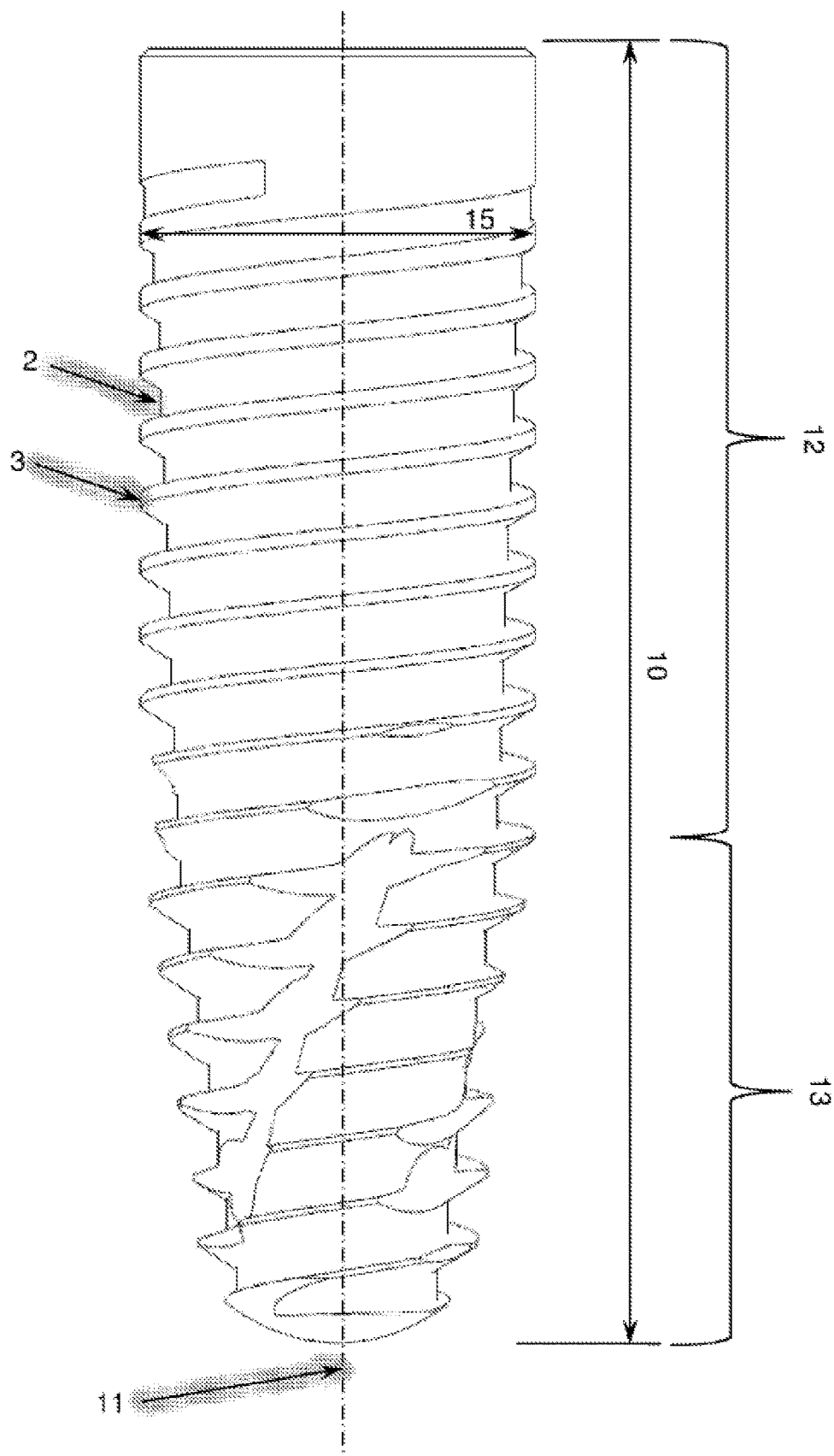
FIG. 2 illustrates a second front view of the proposed implant highlighting the regions along the body thereof.

At the coronal end 17, the external diameter (screw thread diameter) 15 of implant 1, measured at its widest portion, ranges from 3.5 mm to 5.0 mm, preferably 3.5 mm, 3.75 mm, 4.0 mm, 4.3 mm or 5.0 mm, however, it is not restricted to these measurements (see FIG. 2). In turn, the diameter 14 of the core 2 of the implant 1 has a maximum value of 3.2 mm to 4.6 mm, preferably 3.2 mm, 3.4 mm, 3.6 mm, 3.9 mm or 4.6 mm, but not restricted to these measurements (see FIG. 1). In a preferred embodiment, the apical end 16 is preferably rounded, having a semi-spherical shape with a diameter ranging from 1.65 mm to 2.2 mm, but not restricted to these measurements (see FIG. 4). Note that the maximum external diameter of screw thread 15 will be equal to the diameter measured at the coronal end 17.

Said apical end 16 has a reduced diameter compared to the implant body 1. This feature of the apical end 16 allows the implant to be inserted into a bone opening of reduced diameter. More specifically and in a preferred embodiment, the diameter of the apical end 16 of implant 1 allows the insertion after a 2.0 mm drill bit has passed. Additionally, implant insertion 1 may be performed after using a drill bit of varying diameters, such as 2.8 mm or greater, depending on the clinical condition of each patient.

The insertion of the implant in bone openings of reduced diameter is especially advantageous in patients with type III and IV bones (soft/trabecular bones), because this procedure will lead to high bone tissue compressing, increasing the chances of obtaining primary stability, even in these types of bone tissue.

The length 10 of implant 1 ranges from 6 mm to 20 mm, preferably 8 mm, 10 mm, 11.5 mm, 13 mm, 16 mm or 18 mm. Along length 10 at least two regions are defined; a first region 12, with high bone compressing power, therefore being a so-called compressive region, and a second region 13, with high cutting and insertion power, being a so-called cutting region. The length of the second region 13 is from 1.0 mm to 2.0 mm larger than the diameter measured at the coronal end 17 of implant 1, preferably being 1.0 mm larger than said diameter. In preferred embodiments, the length of the second region 13 ranges from 4.5 mm to 6.6 mm.

The screw threads 3, defined on the core 2, start at the apical end 16 and run across the implant 1 towards the coronal end 17, closing from 0.3 mm to 1.0 mm below said coronal end 17.

The outlet of the screw thread 3, that is, where the said thread ends, varies depending on the implant diameter, the smaller the outer diameter 15 of screw thread 3, the earlier the outlet of the screw thread begins, to reinforce the coronal end 17 of implant 1, increasing the wall thickness. On the other hand, in implants 1 of larger external diameter 15, the outlet of the screw thread 3 occurs more abruptly, closer to the coronal end 17 of implant 1.

In a preferred embodiment, a thickness of the screw crest 3.1 in the second region 13 has a constant measure of at most 0.1 mm, preferably being of 0.04 mm. On the other hand, the thickness of the screw crest 3.1 in the first region 12 is variable along the implant 1, with a lower value close to the second region 13 and a higher value close to the coronal end 17 (see FIGS. 3 and 4).

Figure 3:
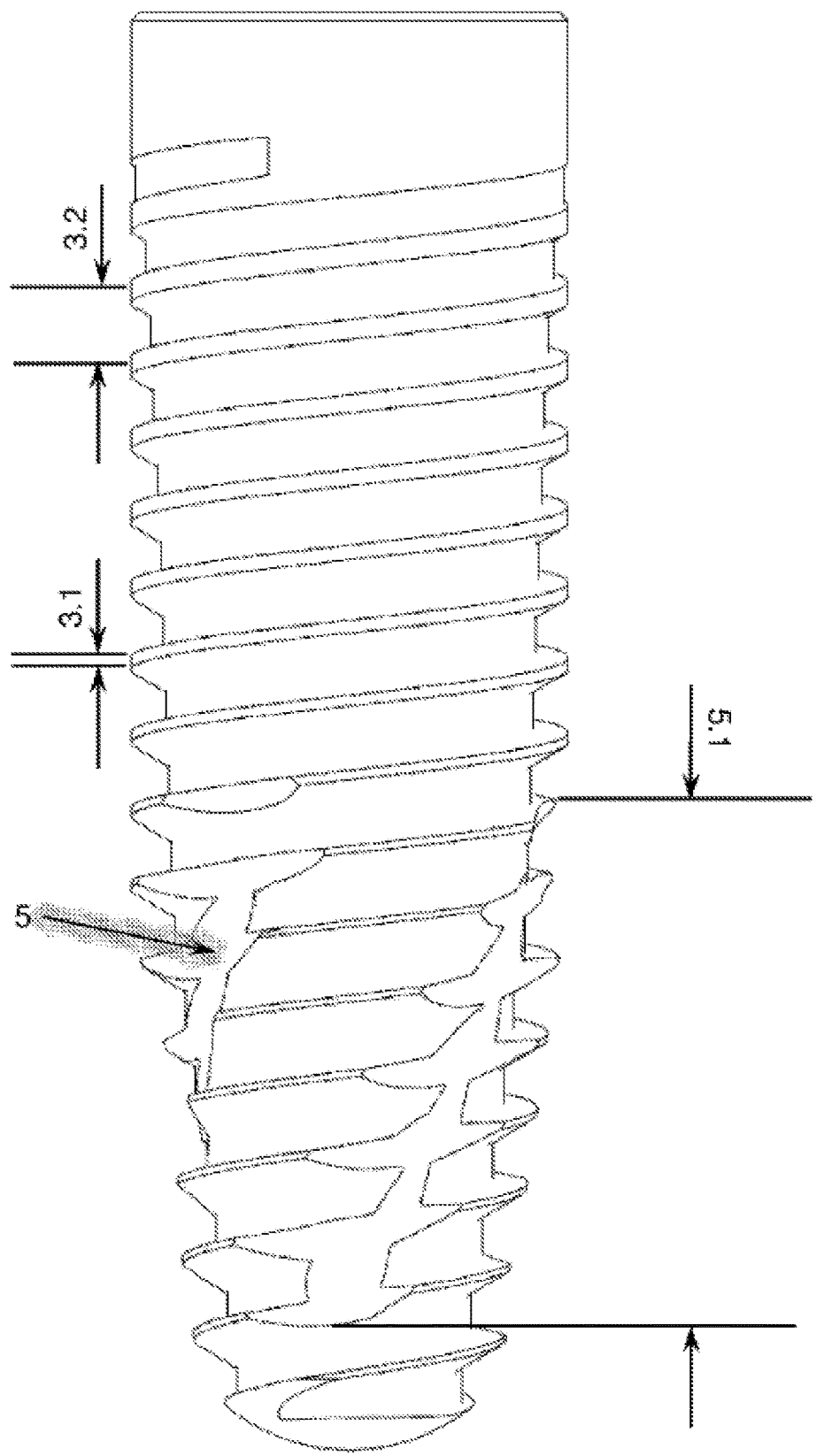
FIG. 3 illustrates a third front view of the proposed implant highlighting properties of screw threads and helical chambers.
Figure 4:
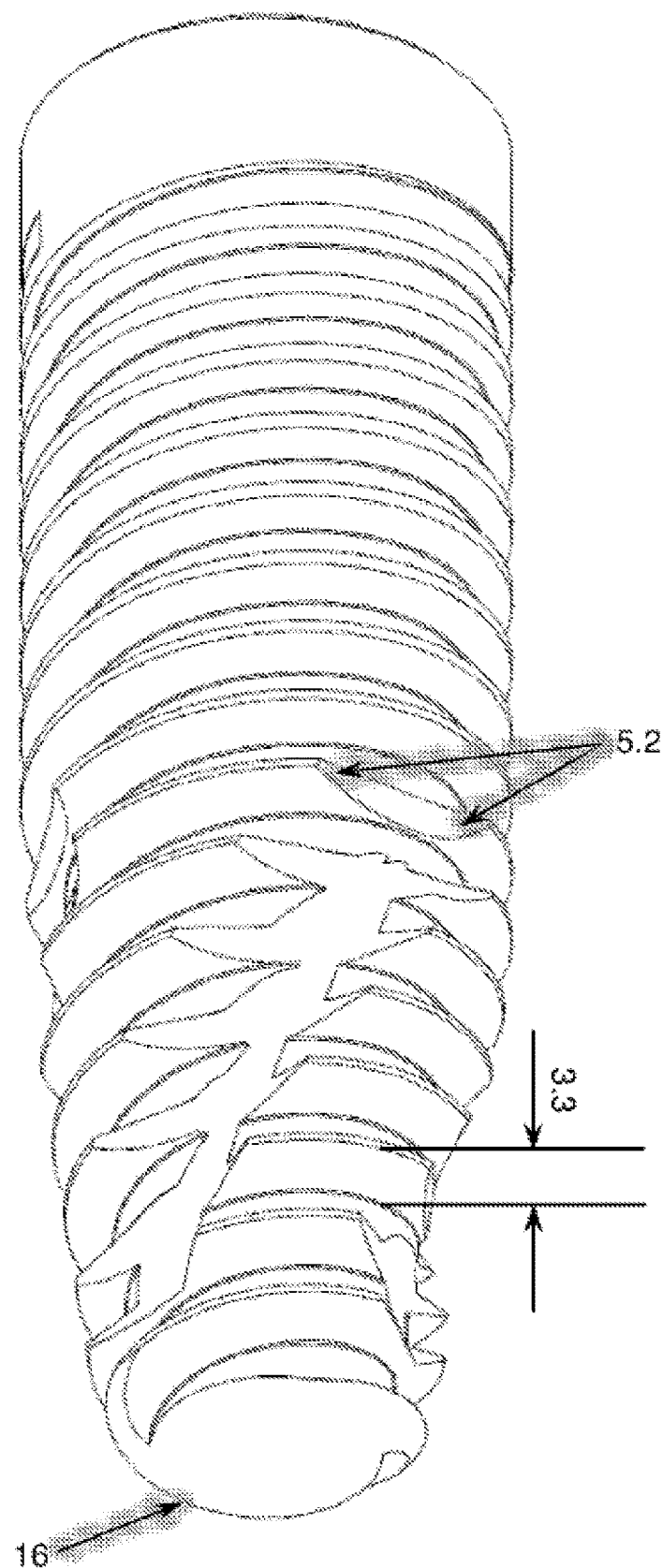
FIG. 4 illustrates a bottom perspective view of the proposed implant highlighting the apical end, properties of screw threads and helical chambers.

Note that the variation in the thickness value of the screw crest 3.1 is especially provided for the first region 12 to present high bone compressing capacity so that primary stability can be achieved even in soft bones (see FIGS. 3 and 4).

In addition, the screw thread pitch 3.2 ranges from 0.6 mm to 0.75 mm, while the thread fillet height 3.3 progressively varies from a minimum of 0.15 mm to 0.35 mm and a maximum of 0.20 mm to 0.55 mm (see FIGS. 3 and 4).

Note that the variation in thread fillet height 3.3 is related to the differences in diameter between the surface of core 2 and the surface of screw threads 3 along implant 1, and the surface of core 2 is defined by the line delimiting the diameter 14 and the screw thread surface 3 is defined by the line delimiting the outside diameter 15 (see FIG. 1).

The apical end 16, as well as the core 2 of the implant 1 is substantially conical in shape, defined by angles measured from the central axis of the implant 11. The angle 6 of the core 2 in the first region 12 is measured between the central axis 11 of the implant and the line defining the surface of core 2 in the first region 12 of the implant, ranging from 2° to 12°. In turn, the angle 7 of core 2 in the second region 13 is measured between the central axis 11 of the implant and the line defining the surface of core 2 in the second region 13, ranging from 14° to 18°, preferably 16° (see FIG. 1).

In other words, when observing only the core 2 of the implant, it can be seen that it has a substantially conical profile, both in the first region 12 and in the second region 13. This geometrical feature in core 2 is also responsible for the cutting feature of the second region 13 and the compressing feature of the first region 12.

Finally, the angle 8 of the screw thread 3 in the first region 12 and the angle 9 of the screw thread in the second region 13 are measured between the central axis of the implant 11 and the line defining the outermost surface of said screw thread 3, the screw thread angle 9 in the second region 13 preferably being the same value of angle 7 of the core 2 in the second region 13, and angle 8 of the screw thread in the first region 12 is preferably equal to zero (see FIG. 1).

Unlike what is shown in relation to the core 2, the screw threads 3 have a substantially conical profile in the second region 13 and a cylindrical profile in the first region 12. Such geometrical feature is also responsible for the cutting feature of the second region 13 and the compacting feature of the first region 12.

As can be observed, due to the geometry of the implant 1, the diameter 14 of the core 2 decreases at a rate in the first region 12 towards the apical end 16, such that the angle 6 of the core 2 in the first region 12 will be greater than angle 8 of screw thread 3 in the first region 12.

Similarly, the diameter 14 of the core 2 decreases at a rate in the second region 13 toward apical end 16, such that angle 7 of the core 2 in the second region 13 will be equal to the angle 9 of the screw thread 3 in the second region 13. In other words, the angles 7 and 9 are congruent. In the second region 13, the diameter 14 of the core 2 decreases at a rate in the same way as the diameter 15 of the screw threads 3.

Having already described, in part, the macro geometry of implant 1, its geometric characteristics will now be related to the installation procedures. This is because for dental implant installation, multiple drill bits are used to open the bone tissue. Gradually wider drill bits are applied until a suitable diameter for implant insertion is reached. For example, in a common procedure of the state of the art for installing a 4.8 mm diameter implant, a first drill bit of 2.0 mm is used, then a second drill bit of 3.5 mm is used, if necessary. In some cases, a profile drill bit and screw thread creation male are still required. Only then can the implant be installed.

At this point, an advantage arises from the present implant. This implant 1 having, for example, a diameter of 4.1 mm and having cutting (of the second region 13) and compacting (of the first region 12) profiles, it can be installed in soft bones directly after the application of a drill bit of 2.0 mm. This insertion, too, is only possible because of the shape of the apical end 16.

Therefore, implant 1 allows fewer drill bit passages to be required (depending on the patient's bone type and clinical condition); higher bone compacting capacity is obtained (by the first region 12); a high level of primary stability is achieved even in type 3 and 4 bones, which in many cases enables immediate loading onto the patient; not being necessary for the screw thread creation male in type 3 and 4 soft bones and the second region 13 to be able to insert into hard bones (cortical) of type 1 and 2.

In addition to the content already described, the implant 1 has at least one helical chamber 5 comprising a length 5.1, measured between its lower and upper ends, so that its lower end begins, preferably a thread above the apical end 16 and its upper end ends, preferably, two threads after the intersection point between the first region 12 and the second region 13.

The helical chamber 5 aims to direct the bone material to the first region 12, increasing compression and compacting in this region and, consequently, the primary stability of implant 1.

The helical chamber 5 also has a depth measured from the screw crest 3.1 to the base of said chamber. This depth is variable along its length 5.1, and the lowest depth value is arranged at the lower and upper ends of the helical chamber 5. In other words, the helical chamber 5 starts out shallow, and its depth gradually increases toward the midline of length 5.1 of said chamber 5.

Figure 5:
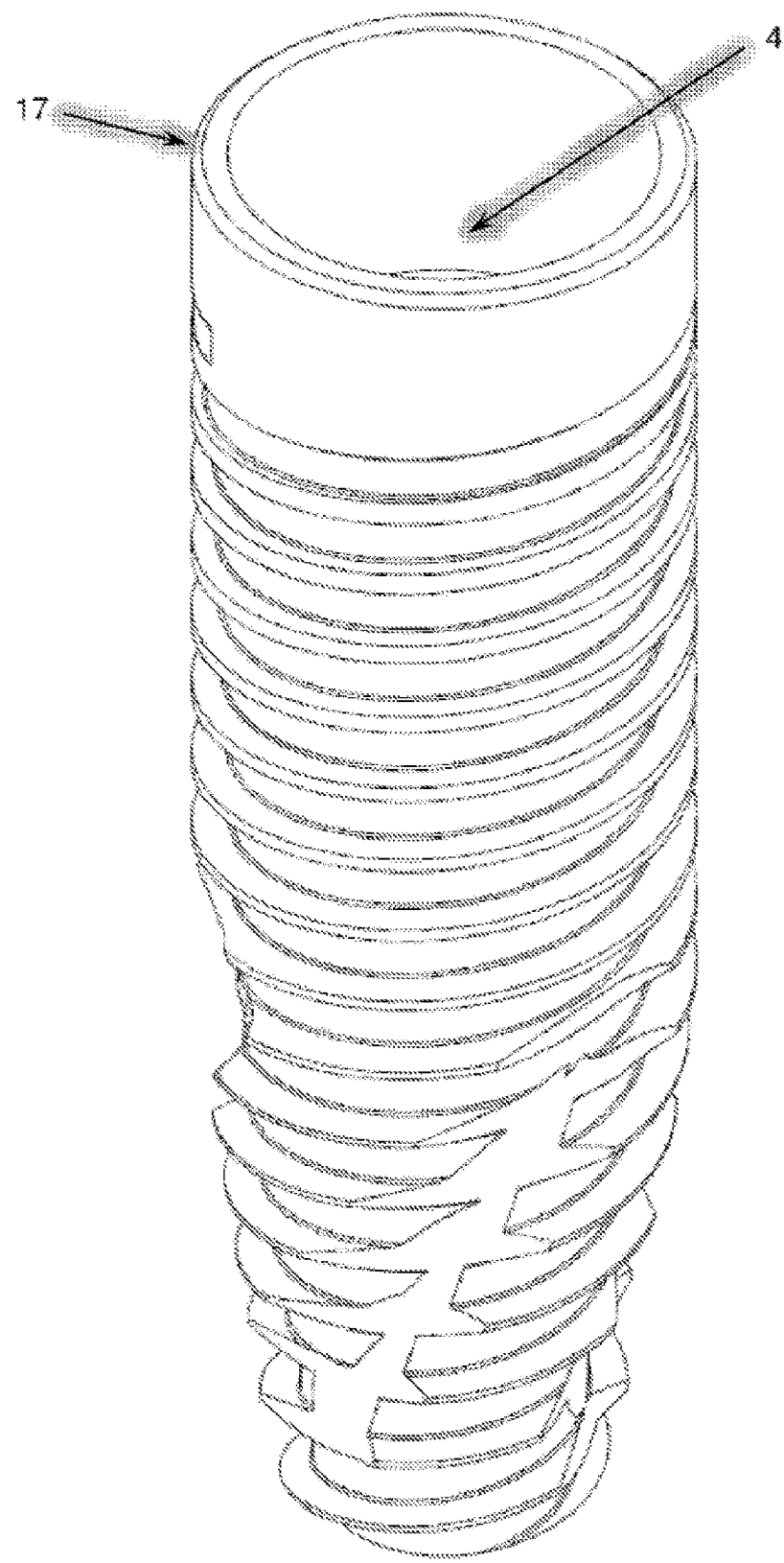
FIG. 5 illustrates a top perspective view of the proposed implant highlighting the coronal end.

It is essential to note here that the depth of the chamber 5 has a lower value than the minimum thread fillet height 3.3 at the ends of said helical chamber 5 and a higher value than the maximum thread fillet height 3.3 at the midline of length 5.1 of chamber 5 (see FIGS. 4 and 5).

In other words, and as can be seen from the figures, the end of the helical chamber 5 represents a tiny cut in the screw crest 3 and gradually increases in depth along its length until it reaches and exceeds the surface of the core 2. Note that the helical chamber 5 does not invade the apical end 16, that is, the helical chamber 5 does not extend to the end of the implant 1.

In addition, the helical chamber 5 has transition faces 5.2 in the side portions, which aims to facilitate the outflow of bone material within the chamber 5. These transition faces 5.2 are inclined with respect to the surface of the core 2 having an angle with this surface ranging from 20° to 160°. In other words, the transition faces 5.2 represents the inclined sidewalls of the helical chamber 5.

It is also important to note that there is a possibility of applying a counter torque in the implant 1 during its insertion in the bone tissue. Also, during this counter torque, the helical chambers 5 allow for flow of bone tissue inside, but in the opposite direction to the one that occurs in the application of torque.

Another advantage obtained by implant 1 of the present invention is the ability to maintain similar installation torque for different implant diameters. This is possible given the combination of the implant with an overflow drill bit (not shown).

The overflow drill bit has a diameter such that the diameter of the implant 1 measured at the coronal end 17 should be smaller than that of the drill bit. This diameter difference decreases for a harder bone, that is, more bone is removed for larger diameter drill bits, so that implant 1 interacts with less material, enabling more uniform torque to be maintained.

This torque maintenance facilitates the dentist/doctor's work at the time of implant placement, as regardless of the type of bone being worked, the force exerted will be the same. Excessive torques that can break the implant or insufficient torques that makes the implant loose can be avoided, which may cause it to exit the insertion opening.

Finally, note that the existence of two regions (regions 12 and 13) with different geometric profiles in the implant 1 allows the implant 1 to be successful in the installation in a patient with bone region comprising different hardness profiles. This condition is clear from FIGS. 6A and 6B, in which a bone opening (artificial) comprising a portion of soft bone (trabecular) at the top and hard bone at the bottom (cortical) can be seen. The first region 12, through its geometry, enables high bone compressing in the trabecular region and corresponding primary stability. In turn, the second region 13, through its geometry, presents cutting capacity for insertion in hard bone (cortical). In addition, the screw threads 3 in contact with the cortical bone generate traction during installation, thus facilitating the insertion of the implant.

Having described a preferred embodiment example, it should be understood that the scope of the present invention covers other possible variations and is limited only by the content of the appended claims, including the possible equivalents thereof.

LIST OF REFERENCE SIGNS

1 Implant
2 Core
3 Screw thread
3.1 Screw crest
3.2 Screw thread pitch
3.3 Thread fillet height
4 Prosthetic interface
5 Helical chamber
5.1 Helical chamber length
5.2 Helical chamber transition faces
6 Core angle in the first region
7 Core angle in the second region
8 Screw thread angle in the first region
9 Screw thread angle in the second region
10 Implant length
11 Implant central axis
12 First region
13 Second region
14 Core diameter
15 Screw thread external diameter
16 Apical end
17 Coronal End

The invention claimed is:
1. A dental implant, comprising:
a core having a diameter, wherein:
  a screw thread is on a surface of the core;
  a helical chamber on the surface of the core, the helical chamber having a depth and a length;
  the core has a coronal end and an apical end with a first region and a second region located between the coronal end and the apical end with the first region located adjacent to the coronal end and the second region located adjacent to the apical end;
  the core has a central axis with a length of the core being between the coronal end and the apical end along the central axis;
  a first angle is defined between the central axis and a line defining the surface of the core in the first region, and a second angle is defined between the central axis and a line defining the surface of the core in the second region;
  a third angle is defined between the central axis and an outermost surface of the screw thread in the first region, and a fourth angle is defined between the central axis and a line defining an outermost surface of the screw thread in the second region,
  the diameter of the core decreases at a rate in the first region towards the apical end such that the first angle is greater than the third angle, the diameter of the core decreases at a rate in the second region towards the apical end such that second angle is the same as the fourth angle,
the first angle ranges from 2° to 12° and the second angle ranges from 14° to 18°,
the apical end has a semi-spherical shape with a maximum diameter ranging from 1.65 mm to 2.2 mm, and
the helical chamber comprises transitional faces on sides, each transitional face having an angulation with respect to the surface of the core, which varies from 20° to 160°.

2. The dental implant of claim 1, wherein the third angle is zero.

3. The dental implant of claim 1, wherein the diameter of the core at the coronal end ranges from 3.5 mm to 5.0 mm.

4. The dental implant according to claim 1, wherein a maximum value of the diameter of the core ranges from 3.2 mm to 4.6 mm.

5. The dental implant according to claim 1, wherein the length of the core ranges from 6 mm to 20 mm.

6. The dental implant of claim 1, wherein a length of the second region is from 1.0 mm to 2.0 mm larger than the diameter of core at the coronal end.

7. The dental implant according to claim 1, wherein a length of the second region ranges from 4.5 mm to 6.6 mm.

8. The dental implant according to claim 1, wherein the screw thread begins at the apical end and ends 0.3 mm to 1.0 mm from the coronal end.

9. The dental implant of claim 1, wherein a thickness of a screw crest of the screw head in the second region is constant and is at most 0.1 mm, the thickness being measured parallel to the central axis.

10. The dental implant according to claim 1, wherein a thickness of a screw crest of the screw head in the first region is variable and increases towards the coronal end, the thickness being measured parallel to the central axis.

11. The dental implant according to claim 1, wherein the screw thread has a pitch and a thread fillet height, the thread fillet height being a height of a thread from the surface of the core to a crest of the thread, the pitch ranging from 0.6 mm to 0.75 mm, and the thread fillet height ranging from a minimum value of 0.15 mm to 0.35 mm and of a maximum value of 0.20 mm to 0.55 mm.

12. The dental implant according to claim 1, wherein the core comprises a prosthetic interface selected from a group including morse taper, external hexagon and internal hexagon.

13. The dental implant according to claim 1, wherein the depth of the helical chamber varies along its length so that a smallest depth value occurs at the ends of the helical chamber.

14. The dental implant according to claim 1, wherein the depth of the helical chamber has a lower value than a minimum thread fillet height at ends of the helical chamber and a higher value than a maximum thread fillet height at the midpoint of the helical chamber, a thread fillet height being a height of a thread from the surface of the core to a crest of the thread.

15. The dental implant according to claim 1, wherein the helical chamber extends from the second region to the first region.

* * * * *